United States Patent Office 3,006,147
Patented Oct. 31, 1961

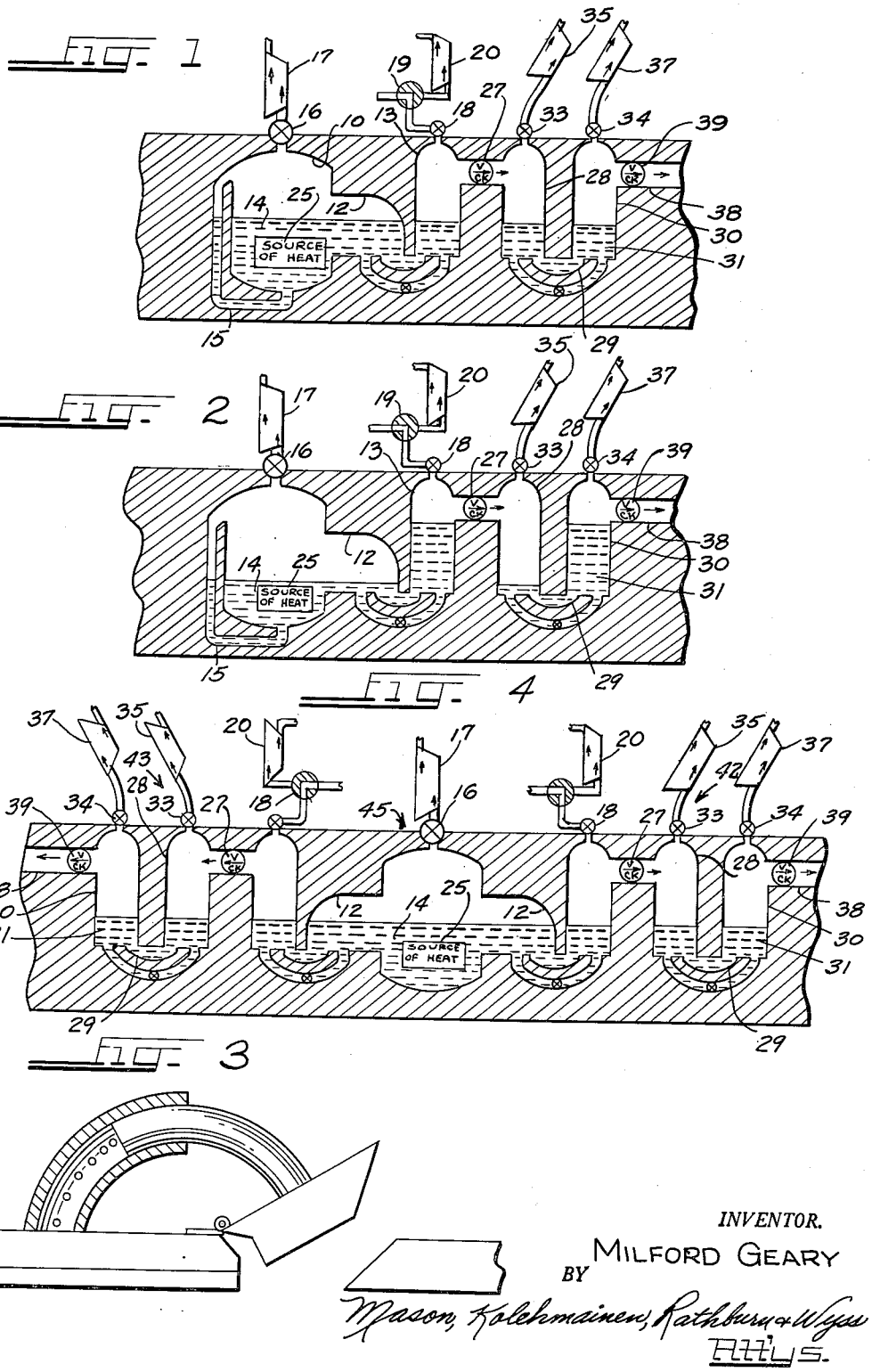

3,006,147
HYDROSTATIC POWER PROCESS
AND APPARATUS
Milford Geary, Chicago, Ill.
(R.R. 1, Polo, Ill.)
Filed Sept. 4, 1958, Ser. No. 759,023
6 Claims. (Cl. 60—49)

The present invention relates to power plants and it more particularly relates to a method and apparatus for storing the large quantities of energy which are released when certain types of explosions occur.

Many types of explosive devices release, in a very short time, large quantities of energy in the form of heat, which, if not stored or immediately used, are wasted. Large quantities of heat can ordinarily be produced at a lower cost by the detonation of an explosive material than by the relatively slow release of heat in a controlled heat producing process. This is particularly true in the production of heat by means of atomic fission, and therefore, it would be desirable to provide a method and apparatus for efficiently using the energy released by atomic fission for domestic and industrial purposes.

Therefore, an object of the present invention is to provide a new and improved power plant.

Another object of the present invention is to provide a new and improved method and apparatus for converting heat energy into mechanical energy.

A further object of the present invention is to provide new and improved apparatus for converting heat energy into mechanical energy and for storing the mechanical energy until the desire for its use arises.

Another object of the present invention is to provide a new and improved method and apparatus for enabling the efficient production of power.

Another object of the present invention is to provide a new and improved method and apparatus for enabling the efficient production of power produced by an atomic explosion.

Briefly, the above and further objects are realized in accordance with the present invention by converting the heat energy released upon detonation of an explosive material into hydrostatic energy and thereafter controllably releasing said hydrostatic energy. Apparatus for carrying out this process may comprise a primary combustion chamber in which the explosion occurs and one or more additional storage chambers suitably connected to the combustion chamber so that when the explosion occurs, water or other liquid contained in said combustion chamber is at least partially vaporized and forces the water from either the combustion chamber or one of the storage chambers up into another one of the storage chambers. Suitable valves are provided for maintaining the water in this latter position until the need for the energy thus stored is desired, at which time the water is controllably permitted to return to is original position, the hydrostatic or potential energy thereof being used to drive a turbine or the like.

Further objects and advantages and a better understanding of this invention may be had by reference to the following detailed description and to the drawings, in which:

FIG. 1 is a schematic diagram of a power plant embodying the present invention prior to the generation of heat therein;

FIG. 2 is a view similar to that of FIG. 1 but showing the power plant after heat had been generated therein and energy is being stored;

FIG. 3 is a cross sectional view of a check valve useful in a power plant embodying the present invention; and FIG. 4 is a schematic diagram of another power plant embodying the present invention.

Referring now to the drawings and particularly to FIGS. 1 and 2 thereof, there is shown a principal combustion chamber 10 which is formed in any suitable structure 11 such, for example, as in a rock formation in the earth. The lower portion of the chamber 10 is connected by means of a passageway 12 to the bottom of an auxiliary chamber 13, and a quantity of water or other liquid 14 is contained in the chambers 10 and 13 and in the passageway 12. In order to cool the walls of the chamber 10, a plurality of passageways 15, only one of which is shown in the drawing, connect the bottom of the combustion chamber 10 with the upper portions thereof. The top of the chamber 10 is connected via a valved passageway 16 to a turbine 17 and a similar valved passageway 18 and a three-way valve 19 connect the top of the chamber 13 to a turbine 20.

In order to generate power for driving the turbines 17 and 20 in the apparatus of the present invention, a suitable source of heat such, for example, as a small atomic fission device or other suitable source of heat 25 such as trinitrotoluene, ammonium nitrate, tetryl or even gasoline if means is included for supplying the necessary oxygen thereto. The device 25 is disposed within the chamber 10, and where the heat generating device 25 produces harmful radio activity, it is preferable that the reaction take place beneath the water level, and therefore, the device 25 is immersed in the liquid 14.

When the device 25 is detonated, a portion of the liquid 14 is vaporized, thus creating a high pressure within the chamber 10. Some of this pressure may be released through the valved passageway 16 to drive the turbine 17, but because considerably greater energy may be released by the device 25 than can be used at one time to drive the turbine 17, a substantial part of this pressure is used to force a portion of the liquid 14 up into the chamber 13 thereby to force the air which was contained in the upper portion of the chamber 13 through the valved passageway 18 and through the valve 19 to the turbine 20.

In order to store part of the energy released from the device 25, the upper portion of the chamber 13 is connected through a passageway 26 containing a check valve 27 to the upper portion of a chamber 28. The chamber 28 is connected at the bottom thereof to the bottom of another chamber 30 by an open passageway 29, and a liquid 31 is contained within the chambers 28 and 30. Accordingly, when the pressure from the upper portion of the chamber 13 is connected to the top of the chamber 28 by the check valve 27 it forces the liquid 31 up into the chamber 30. The condition of the liquid in the various portions of the power plant following the detonation of the device 25 is shown in FIG. 2.

If desired, the intake to the turbine 35 may be closed during detonation of the device 25 so that all of the pressure which passes through the valve 27 is used to force the liquid 31 up into the chamber 30 for storage until such time as it is desired to use it, at which time the valved passageway 33 is opened and air or vapor is forced by the liquid 31 through the turbine 35. Of course, if it is desired to use water turbines rather than air or steam turbines for the generation of electricity, then one or more such turbines may be disposed in the passageway 29 directly between the chambers 28 and 30, thereby to be driven by the liquid 31 as it passes from one chamber to another.

The power plant shown in FIG. 1 includes but a single additional hydrostatic energy storage stage including the chambers 28 and 30, but it will be understood that another passageway 38 including a check valve 39 may be connected between the upper end of the chamber 30 and the upper end of the first chamber of an additional two-chamber energy storage stage (not shown). Moreover, in addition to the chamber 13 and the series of storage stages which may be connected thereto, additional sets of chambers may be provided which correspond with the chamber 13 and associated storage stages. Therefore, as shown in FIG. 4, two sets, 42 and 43, of chambers are connected to the main combustion chamber 45 for storage of the energy generated therein. The particular arrangement of these stages will, of course, depend upon the amount of energy created in the explosion used as the primary source of heat and upon the amount of energy which must be stored for later use.

While a particular embodiment of the invention has been shown, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by Letters Patent of the United States is:

1. A power plant comprising a combustion chamber, an auxiliary chamber, a passageway interconnected between the lower portions of said chambers, a first storage chamber, a second storage chamber, means including a check valve interconnecting the upper portions of said auxiliary and first storage chambers to permit the flow of fluid from said auxiliary chamber to said first storage chamber, a passageway interconnecting the lower portions of said first and second storage chambers, heat generating means disposed in said combustion chamber for vaporizing a portion of a liquid contained in said chambers, and a plurality of means respectively connected to the upper portions of said chambers for converting fluid pressure into mechanical energy.

2. A power plant as set forth in claim 1 wherein said plurality of means comprises respective gas operated turbines.

3. A power plant as set forth in claim 1 wherein said heat generating means is an explosive which releases its energy in a relatively short period of time.

4. A power plant comprising a sealable combustion chamber for containing a substantial quantity of liquid, an explosive disposed within said chamber for generating a sufficient amount of heat to vaporize a substantial portion of said liquid to appreciably increase the pressure in said chamber, means connected to said chamber for storing energy released by said explosive, said means comprising first and second sealable chambers interconnected at the bottoms thereof, said first and second chambers containing a quantity of liquid less than the amount required to fill both of said chambers, means interconnecting said combustion chamber and said first chamber for transferring energy from said combusion chamber to said first chamber, and means for controllably releasing the pressure from said first chamber.

5. A power plant as set forth in claim 4 wherein said means interconnecting said combustion chamber and said first chamber includes a check valve.

6. A power plant as set forth in claim 4 which further includes a second set of sealable chambers interconnected at the bottom thereof, one of which is connected to said combustion chamber for transferring energy from said combustion chamber to said one of said sealable chambers, and additionally including means for controllably releasing the pressure from one of said sealable chambers.

References Cited in the file of this patent
UNITED STATES PATENTS

| 1,259,338 | Alexanderson | Mar. 12, 1918 |
| 2,035,726 | Sheldon | Mar. 31, 1936 |

FOREIGN PATENTS

| 418,105 | France | Sept. 20, 1910 |